United States Patent [19]

Darnell et al.

[11] Patent Number: 4,941,102

[45] Date of Patent: Jul. 10, 1990

[54] TWO-STEP DEBUGGER FOR EXPERT SYSTEMS

[75] Inventors: Michael J. Darnell, Aptos; Joseph M. Hary, Los Gatos; Robert J. Quinn, Fremont, all of Calif.

[73] Assignee: International Business Machines Corporation, Armonk, N.Y.

[21] Appl. No.: 245,475

[22] Filed: Sep. 16, 1988

[51] Int. Cl.$^5$ ............................................. G06F 15/24
[52] U.S. Cl. ................... 364/513; 364/275.5; 364/972.3; 364/200; 364/900
[58] Field of Search ............... 364/513, 200 MS File, 364/900 MS File, 188, 300; 235/385; 371/16, 19

[56] References Cited

U.S. PATENT DOCUMENTS

| | | | |
|---|---|---|---|
| 4,591,983 | 5/1986 | Bennett et al. | 235/385 |
| 4,696,003 | 9/1987 | Kerr et al. | 371/19 |
| 4,713,775 | 12/1987 | Scott et al. | 364/513 |
| 4,730,315 | 3/1988 | Saito et al. | 371/19 |
| 4,752,889 | 6/1988 | Rappaport et al. | 364/513 |
| 4,809,219 | 2/1989 | Ashford et al. | 364/513 |
| 4,819,234 | 4/1989 | Huber | 371/19 |

OTHER PUBLICATIONS

Brownston et al., "Programming Expert Systems in OPS5: An Introduction to Rule-Based Programming", Addison-Wesley Publishing Company, pp. 78-87 (1985).

Primary Examiner—Jerry Smith
Assistant Examiner—Paul Gordon
Attorney, Agent, or Firm—Pryor A. Garnett

[57] ABSTRACT

An apparatus and method for debugging a forward-chaining (rule-based) expert system are disclosed. A single STEP command controls the expert system and automatically presents prefire and postfire displays for observing the system's performance. The debugger alternates between prefire and postfire states. In the prefire state, before the selected rule is fired, the conflict set of rules eligible to be fired, the selected rule to be fired, and the data for that rule are displayed in separate windows. Entry of the STEP command fires the rule and changes the debugger's state to postfire. In the postfire state, the just-fired rule and data updated thereby are displayed. Entry of the STEP command in the postfire state changes the state to prefire and automatically presents the prefire display for the next selected rule.

26 Claims, 3 Drawing Sheets

FIG. 1

TWO-STEP DEBUGGER FOR EXPERT SYSTEMS

BACKGROUND OF THE INVENTION

1. Technical Field

This invention relates to computer software. More particularly, it relates to rule-based expert systems such as those which exhibit artificial intelligence.

2. Description of the Prior Art

Expert systems are widely used to program computers to show artificial intelligence. These systems are considered declarative programs as opposed to procedural programs since they describe intended results, rather than prescribe procedures for obtaining results. Expert systems include forward-chaining systems for drawing conclusions from data using rules, and backward-chaining systems for achieving goals by applying rules to data. A forward-chaining production system consists of rules, data, and a control program. A backward-chaining system further includes one or more goals.

Rules, also known as "productions", are statements of the form "IF condition, THEN action". They represent the knowledge in a production system. The condition part of a rule states one or more facts that must be true for the rule to be applied. The action part states the actions to be taken when the rule is applied. The data represent the facts in a production system.

The control program is a procedure for applying the rules to the data. It operates by repeatedly executing the control cycle. The control cycle is composed of a number of phases, the exact number and nature of which vary depending upon the control program. Classically, the control cycle of a forward-chaining system includes three phases.

Phase 1 of the forward-chaining control cycle selects the set of eligible-to-fire rule instantiations from the set of all rule instantiations. This phase is based in part on which rules match the data. A rule matches the data when all of its stated conditions are true with respect to the data. A rule may match the data in more than one way. Each way is called an "instantiation" of the rule. Thus, an instantiation is a combination of a rule and matching data.

The set of eligible-to-fire rule instantiations is all the rule instantiations that have not been fired. The set of eligible-to-fire rule instantiations is given the colorful name "conflict set" because of the conflict involved in selecting only one of the eligible-to-fire instantiations to be fired.

Phase 2 selects the next rule instantiation to be fired from the set of eligible-to-fire rule instantiations. This phase is based in part on a conflict resolution procedure which selects one rule instantiation to fire if more than one rule instantiation is eligible to fire. The exact criteria used to select the next rule instantiation to be fired may vary from one conflict resolution procedure to another.

In Phase 3, the selected rule instantiation is fired. "Firing" an instantiation (or rule) means that the actions specified in the action part of the rule are carried out (executed). The firing typically modifies (creates, updates or deletes) data in the instantiation, which in turn affects which rules are eligible to fire in the next control cycle. The control cycle is repeated until no rules are eligible to fire.

The firing of rules is analogous to the human reasoning process of drawing deductive conclusions by applying rules to sets of facts. The conclusions drawn may act as additional facts to which other rules are applied to draw additional conclusions. The reasoning process continues until no new additional conclusions can be drawn.

There is a need for an easy-to-use debugger for expert systems. A debugger is a computer program which implements a method of debugging or finding and correcting errors in another "target" computer program. The task of debugging, or finding and correcting errors in a system, is based on being able to observe the behavior of the system. A debugger coordinates the display of information, interpretation of user commands, and execution of the target program.

An easy-to-use debugger for an expert system should allow a single command to both execute the control cycle and automatically display relevant information. At present, users must learn and use a variety of different commands to execute the control cycle and display relevant information.

The debugger should allow the user to observe each rule instantiation before it is fired. This "prefire" information allows the user to determine whether the correct instantiation is selected to be fired. To determine whether the instantiation is correct, the user needs to see the conflict set, the text of the rule, and the data in the next instantiation to be fired. These sources of information should be displayed in context with each other. At present, prefire information is not automatically displayed. Users must explicitly request displays of the conflict set and the data via separate commands before each cycle. These displays are written sequentially on the computer screen from top to bottom, and are frequently larger than the screen, making it difficult to keep information of interest visible on the screen at the same time.

The debugger should also allow the user to observe modifications made to the data after an instantiation is fired. This "postfire" information allows the user to determine whether the correct modifications were made to the data. To determine whether correct modifications were made, the user needs to see the modified data in the context of the text of the rule and data in the just-fired instantiation. At present, the automatic display of postfire information must be requested in advance. Also, as described above, postfire displays of modified data and the data in the just-fired instantiation are written sequentially on the computer screen, making it difficult to keep information of interest visible on the screen at the same time.

SUMMARY OF THE INVENTION

This invention comprises a two-step debugger for an expert system. The system includes storage means for storing data and rules. The system also includes execution means for identifying one or more eligible rules based on the data, selecting one of those rules, and executing the selected rule to modify the data. The debugger of this invention comprises means for displaying at least one of the eligible rules, means for displaying the selected rule to be fired, means for displaying at least part of the data, and stepping means. The stepping means advances the control cycle, and alternates between a prefire state before execution of the selected rule, and a postfire state after execution of the selected rule and identification of newly eligible rules based on the modified data. The stepping means automatically presents prefire and postfire displays. In the preferred embodiment, the prefire display, during the preexecution state, includes at least one of the eligible rules, the selected rule, and at least part of the data. The preferred embodiment's postfire display includes at least one of the newly-identified eligible rules, the just-fired selected rule, and at least part of the modified data.

This invention improves on the prior art as follows. Only one command must be learned and used to execute the control cycle and display prefire and postfire information. The conflict set and the text of the rule and data in the next rule to be fired are automatically presented in each prefire display, thereby making it easier for the user to determine whether the correct instantiation is selected to be fired. The text of the rule and data in the just-fired instantiation and any data modified by the just-fired rule are automatically presented in each postfire display, thereby making it easier to determine whether the data was modified correctly. In the preferred embodiment, the conflict set, rule text, and data are simultaneously displayed on the computer screen in separate windows making it easy to keep information of interest visible on the screen at the same time.

Other features and advantages of this invention will become apparent from the following detailed description of the presently preferred embodiment of the invention, taken in conjunction with the accompanying drawings.

DESCRIPTION OF THE PREFERRED EMBODIMENT

The preferred embodiment of this invention provides a single control command ("STEP") for executing the control cycle and automatically presenting separate prefire and postfire displays. The preferred embodiment also provides these displays using separate windows for the conflict set, the rule text, and the data.

The invention is implemented in a production system debugger. The debugger provides the user with a large set of functions beyond the scope of this invention. Thus, the following sections focus on describing only the implementation of the following three features: the STEP command, the prefire display, and the postfire display.

The STEP command causes the control program to execute the control cycle, and alternates between the prefire state in which the selected rule is identified and prepared to be fired, and the postfire state in which the selected rule has just been fired. Repeated use of the STEP command allows the user to observe the step-by-step behavior of forward-chaining production systems.

The prefire display shows the current conflict set, the text of the rule in the next instantiation to be fired (the selected rule), and the data for the selected rule. The postfire display shows the current conflict set, the text of the rule in the just-fired instantiation, the data in the just-fired instantiation, and data modified (updated, deleted, or newly created) by the just-fired rule.

Figure 1:
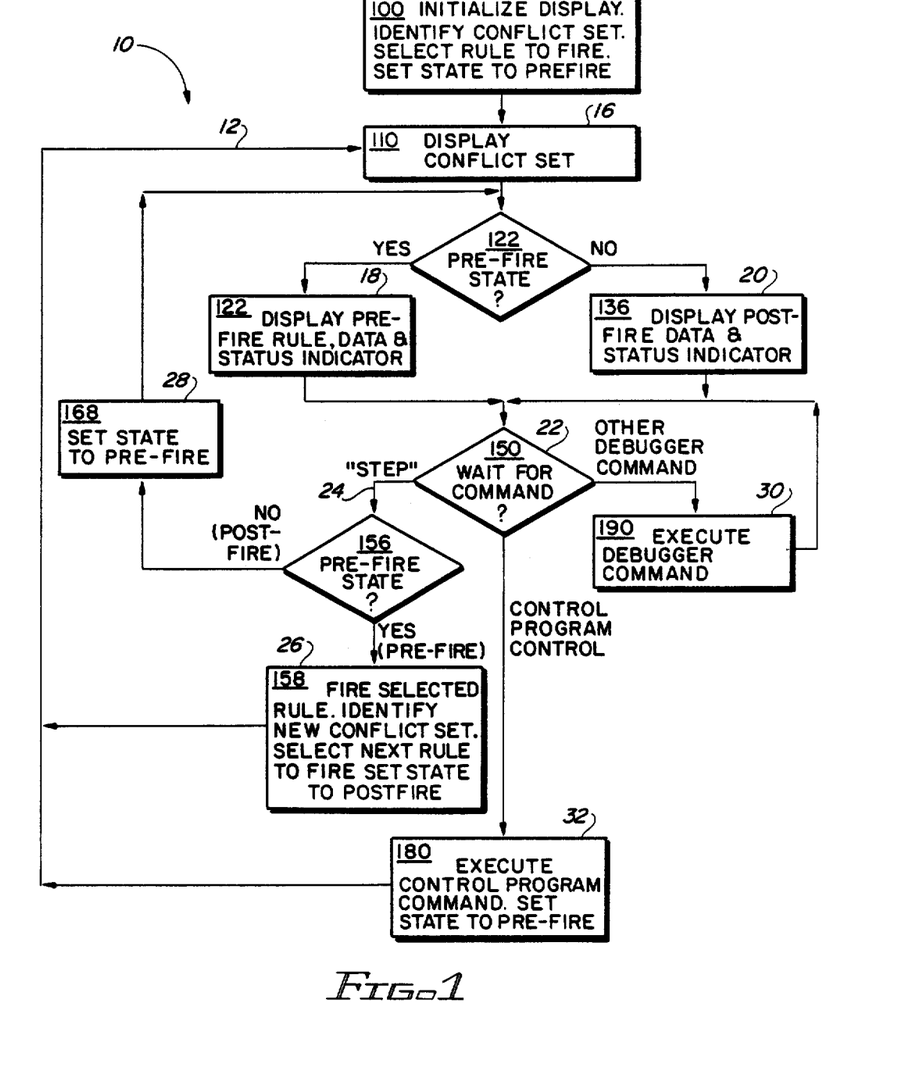
FIG. 1 is a schematic overview of the method of the preferred embodiment of this invention as used in a forward-chaining expert system.

The flowchart of FIG. 1 provides a schematic overview of the operation of the preferred embodiment of the two-step debugger of this invention. The debugger 10 essentially comprises a loop 12 which displays the conflict set, the selected rule, and the data for that rule, and then waits for a command. Upon receipt of a command, the command is executed and the loop 12 is repeated to update the display and wait for another command. Commands other than the STEP command are passed to other portions of the debugger or to the control program as appropriate.

When the debugger 10 is initialized 14, the first phases of the control cycle are executed to identify the conflict set and select a rule to be fired. The debugger 10 is then placed in the "prefire" state, indicating that a rule instantiation is ready to be fired. Next, the loop 12 is entered and the conflict set, selected rule, and data are displayed.

The current conflict set is displayed 16 in both the prefire and postfire states. Then, if the debugger is in the prefire state, the selected rule to be fired, the data relevant to that rule, and a status indicator of the debugger's prefire state are displayed 18. Otherwise, if the debugger is in the postfire state (immediately after firing of the selected rule), the data changed by the just-fired rule is displayed 20 together with a status indicator for the debugger's postfire state.

After the prefire or postfire display is made, the debugger 10 waits 22 for a command from the user. If the user issues the STEP command 24, the debugger's response depends on whether it is in the prefire or postfire state. If the debugger 10 is in the prefire state with the selected instantiation ready to be fired, when the user issues the STEP command 24 the debugger causes the control program to fire the selected rule, to identify a new conflict set based on data updated by the just-fired rule, and to select a next rule to be fired, all as shown at 26 in FIG. 1. The debugger is then placed in the postfire state, and the main loop 12 is repeated to display the postfire display 16, 20 and wait for another command 22.

If the user issues the STEP command 24 and the debugger is in the postfire state, then the debugger's state is set to prefire 28, and the main loop 12 is repeated as above except that the conflict set is not redisplayed.

If the user enters a debugger command other than STEP (one that does not affect the control program), it is executed immediately 30 and the debugger 10 then waits for another command 22. If the user enters a control program command (a debugger command which does affect the control program), it is immediately executed 32. This execution results in the identification of a new conflict set and the selection of a new rule to be fired. After this, the debugger's state is set to prefire, and the main loop 12 is repeated to display the prefire display 16, 18.

A pseudocode implementation of the STEP command, given in Example 1 below, is discussed next. It will be noted that selected line numbers from Example 1 are included in the flowchart of FIG. 1 for ready reference.

The STEP Command

The STEP command is a single control command that may be used to cause the debugger to execute the control cycle and to automatically present the prefire and postfire displays. Repeated STEP commands allow the user to observe the step-by-step behavior of a forward-chaining production (expert) system. This section describes how the STEP command coordinates the control cycle, and prefire and postfire displays.

The debugger coordinates the display of information, interpretation of user commands and the control program. The control program is the procedure which applies the rules to the data and embodies the control cycle of the production system. The STEP command is one of the commands interpreted by the debugger. The pseudocode in Example 1 shows how the STEP command coordinates the control cycle and the presentation of prefire and postfire displays.

EXAMPLE 1

```
Example 1
Pseudocode Implementation of STEP Command

100   State = prefire
            /* Set state variable to prefire */
102   READ source code
            /* Read source code from file */
104   DISPLAY source code in source window
            /* Display window */
106   CALL control program
108         /* Execute phases 1 & 2 of cycle */
110   GET conflict set
            /* Get from control program */
112   CLEAR conflict set window
            /* Erase window */
114   DISPLAY conflict set in conflict set window
            /* Display window */
116   GET prefire rule name
            /* Get from control program */
118   GET prefire data
120         /* Get from control program */
122   IF state = prefire THEN DO
            /* Prefire state */
124       POSITION prefire rule text at top of source window
                /* Make rule text visible */
126       CLEAR class window
                /* Erase window */
128       DISPLAY prefire data in class window
                /* Display window */
130       DISPLAY "Prefire" status indicator in source window
132       DISPLAY "Prefire" status indicator in class window
134       END
136   ELSE DO
            /* Postfire state */
138       CLEAR class window
                /* Erase window */
140       DISPLAY postfire data in class window
                /* Display window */
142       DISPLAY "Postfire" status indicator in source window
144       DISPLAY "Postfire" status indicator in class window
146       END
148
150   WAIT for command
            /* Wait for user command */
152   IF command = exit THEN EXIT
            /* Exit the debugger */
154   IF command = step THEN DO
            /* STEP command specified */
156       IF state = prefire THEN DO
                /* Prefire state */
158           CALL control program
                    /* Execute phase 3 of the current
                       control cycle and phases 1 & 2 of the
                       next control cycle */
160           GET postfire data
                    /* Get from control program */
162           State = postfire
                    /* Set state variable to postfire */
164           GOTO 110
166           END
168       ELSE DO
                /* Postfire state */
170           State = prefire
                    /* Set state variable to prefire */
172           GOTO 122
174           END
176
178       END
180   IF command = control program command THEN DO
            /* Command affects the control program */
182       CALL control program
                /* Call control program to perform
                   command */
184       State = prefire
                /* Set state to prefire */
186       GOTO 110
188       END
190   ELSE DO
            /* Command does not affect control program */
192       CALL subroutine
                /* Call appropriate debugger subroutine */
194       GOTO 150
196       END
```

The pseudocode program fragment of Example 1 operates as follows. When the debugger program is initially started, a state variable is set to prefire (line 100), and the production system source code is read from a file (line 102) and displayed in the source window on the screen (line 104).

Then the control program is called to execute phases 1 and 2 of the control cycle (line 106). As described above, phase 1 of the control cycle identifies the set of eligible-to-fire rule instantiations (the conflict set) from the set of all rule instantiations. In phase 2 the next rule instantiation to be fired is selected from the set of eligible-to-fire rule instantiations. The debugger program gets the resulting conflict set (line 110) from the control program, and displays it in the conflict set window on the screen (lines 112–114). The debugger program also gets the rule name and data in the next instantiation to be fired from the control program (lines 116–118).

Next, the debugger program checks to determine whether the state variable is set to prefire or postfire (line 122). If it is prefire, the source code is positioned in the source window to show the text of the rule in the next instantiation to be fired (line 124). The data in the next instantiation to be fired is displayed in the class window (lines 126–128). The "Prefire" status indicator is shown in both source and class windows (lines 130–132).

If the state variable is set to postfire (line 136), the debugger program displays in the class window the data in the just-fired instantiation and any data modified by the just-fired rule (lines 138–140). The "Postfire" status indicator is shown in both source and class windows (lines 142–144).

Next, the debugger program waits for the user to specify a command (line 150). Two commands (STEP and EXIT) control the debugger display and are processed by the program shown in Example 1. All other debugger commands are passed to the other portions of the debugger for execution. Commands for the control program (e.g., ALLOCATE, UPDATE, DELETE, RUN, etc.) are passed to the control program. After a debugger or control program command has been executed, the program fragment of Example 1 resumes execution.

When the user specifies a command, the debugger program checks if the command is EXIT (line 152). If it is EXIT, the debugger program terminates (line 152). If it is not EXIT, the program checks if the command is STEP (line 154). If the command is STEP, the program checks if the state variable is prefire (line 156). If it is prefire, then the control program is called to execute phase 3 of the current control cycle and phases 1 and 2 of the next control cycle (line 158). In phase 3, the selected rule instantiation is fired, modifying the data. Phases 1 and 2 of the control cycle are as described above for line 106 of Example 1. The debugger program gets (line 160) the resulting postfire data (the data in the just-fired instantiation and any data modified by the just-fired rule) from the control program. The state variable is changed to postfire (line 162) and the program branches (line 164) back to line 110 to refresh the display. If the command is STEP and the state variable is postfire (line 168), the state variable is changed to prefire (line 170) and the program branches (line 172) back to line 122 to refresh the display.

If the command is not STEP, the program checks if the command is one of the other commands which affects the control program (line 180), and if so the control program is called to execute the command (line 182). After the command is executed, the state variable is set to prefire (line 184) and the debugger program branches (at 186) back to line 110 to refresh the display.

If the command is not one of the commands which affects the control program (line 190), the appropriate debugger program subroutine is called to execute the command (line 192). After the command is performed, the debugger program branches (line 194) back to line 150 to wait for another command.

Prefire Display

The prefire display allows the user to observe each rule instantiation before it is fired in order to determine whether the correct instantiation has been selected to be fired. To determine whether the instantiation is correct, the user needs to see, in context with each other, the conflict set, the text of the rule, and the data in the next instantiation to be fired. The prefire display presents the conflict set, the text of the rule, and the data in the next instantiation to be fired. These sources of information are presented in separate windows on the same display.

Figure 2:
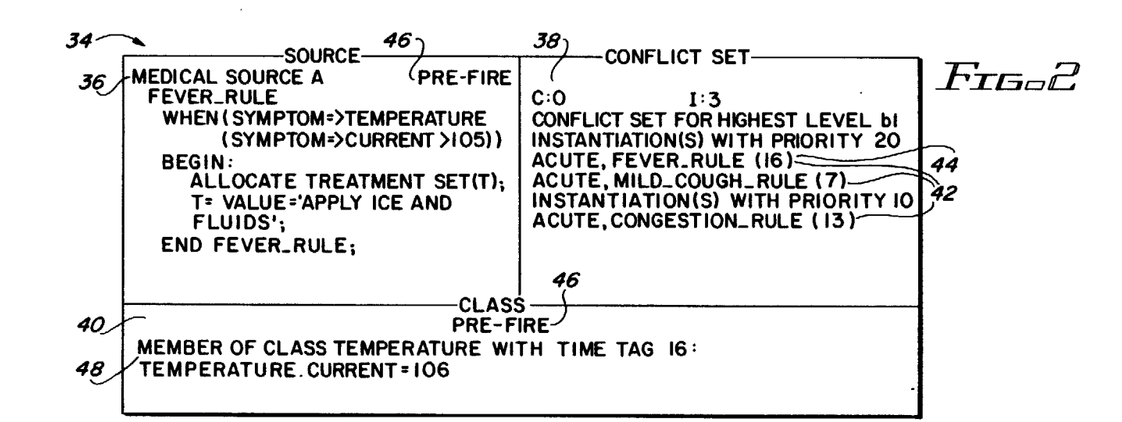
FIG. 2 is a screen image of a prefire display according to the preferred embodiment of this invention for a medical treatment forward-chaining expert system.

A sample prefire display is shown in FIG. 2. The display 34 includes three separate windows: source, conflict set, and class. A window is an area of a computer screen used to display related information. A window is typically rectangular and delineated by distinct borders. The information displayed in the window may be larger than the window. Thus, when information is displayed in a window only part of the information may be visible at one time. Functions are provided to reposition the information with respect to the window to make any part of the information visible in the window.

The source window 36 displays the text of the rule in the next instantiation to be fired. The source window in FIG. 2 shows that the next rule to be fired is named FEVER_RULE. The text of rule appears in the underlying production system language. In English, the rule might be paraphrased as "IF the patient has a temperature over 105 degrees THEN the treatment should include applying ice and fluids". The conflict set window 38 shows the set of rule instantiations which are eligible to be fired. Note that the sample prefire display of FIG. 2 shows that three instantiations are eligible to be fired. The class window 40 shows the values of the data element(s) in the next instantiation to be fired. In FIG. 2, the data in the next instantiation to be fired represents the fact that the patient's temperature is 106 degrees. The following sections describe the contents of the windows in more detail.

The title "SOURCE" is presented on the top border of the source window 36, which shows the source code for the currently executing production system. The rule text comprises part of the source code. Note that in FIG. 2 the source code is larger than the source window. The source code is automatically repositioned in the window to display the text of the rule in the next instantiation to be fired (e.g., FEVER_RULE). The first line of the source window indicates the file containing the source code (e.g., MEDICAL SOURCE A) and the Prefire status indicator 46.

The title "CONFLICT SET" is presented on the top border of the conflict set window 38, which shows the current conflict set. One line of text 42 is displayed for each instantiation in the conflict set. Each line contains the name of the rule procedure containing the instantiation, (e.g., ACUTE), the name of the rule in the instantiation (e.g., FEVER_RULE), and the time tags of the class members in the instantiation (e.g., 16 ). A rule procedure is a user-defined group of related rules in the source code. The source code may contain one or more rule procedures. In this preferred embodiment, the data elements are called "class members" because each element belongs to a user-defined class or type of data. Each class has a name (e.g., TEMPERATURE) and one or more attributes (e.g., CURRENT) that represent different aspects of the data. All members of a class have the same name and attributes but may have different attribute values. For example, one member of the class TEMPERATURE may have a CURRENT value of 106, and another may have a CURRENT value of 107. This allows multiple data elements with the same form, or multiple identical data elements to be represented.

Each data element (class member) is identified by a unique number called a time tag. Data elements are assigned a time tag when they are created. Each time a data element is modified it is assigned a new time tag. Time tags are assigned to data elements so that the most recently modified data element has the largest time tag. Time tags may be used by the conflict resolution procedure to determine which instantiation should be selected to be fired next. This is analogous to the human problem solving strategy of focusing attention on new information when solving a problem.

The instantiations are presented in the conflict set window 38 from top to bottom in the order of their eligibility to fire based on a conflict resolution procedure which is part of the control program. The conflict resolution procedure selects one member of the conflict set to be fired. The details of the conflict resolution procedure are not essential to an understanding of this invention, and are not discussed further since such procedures are known in the art. The next instantiation to be fired 44 (e.g. ACUTE, FEVER_RULE (16)) is presented on top.

The first line of the conflict set window 38 shows the cycle indicator "C:", and the number of instantiations in the conflict set "I:". The cycle indicator indicates the number of rules that have been fired since the production system was started.

The title "CLASS" is presented on the top border of the class window 40. The first line of the class window shows the prefire indicator 46. In the prefire display 34, the class window shows the data elements 48 (class members) in the next instantiation to be fired. A header line showing the name of the class (e.g. TEMPERATURE) and the time tag of the data element (e.g. 16) is displayed for each data element. Following each header, a line 49 is presented for each attribute-value pair (e.g. TEMPERATURE.CURRENT=106) in the data element. The order of data elements is sorted to match the order of conditions in the text of the next rule to be fired.

Although the windows and their contents are an important aspect of this invention, the details of the procedures for constructing the windows on the screen are not important. There are many procedures for constructing windows on a screen and such procedures are known in the art.

The prefire display 34 allows the user to observe each rule instantiation before it is fired in order to determine whether the correct instantiation is selected to be fired. To determine whether the instantiation is correct, the user needs to see, in context with each other, the conflict set, the rule text of the next instantiation to be fired, and the data in that rule. The prefire display 34 of this invention's debugger presents this information in separate windows 36, 38, 40 on the same display, simplifying the job of debugging the expert system.

Postfire Display

The postfire display allows the user to observe any modifications (updates, deletions, newly created data) made to the data after an instantiation is fired, to determine whether the correct modifications were made to the data. To determine this, the user needs to see the modified data in the context of the text of the rule and the data in the just-fired instantiation. The postfire display presents the conflict set, the text of the rule, and the data in the just-fired instantiation along with any data modified by the just-fired rule. These sources of information are presented in separate windows on the same display.

Figure 3:
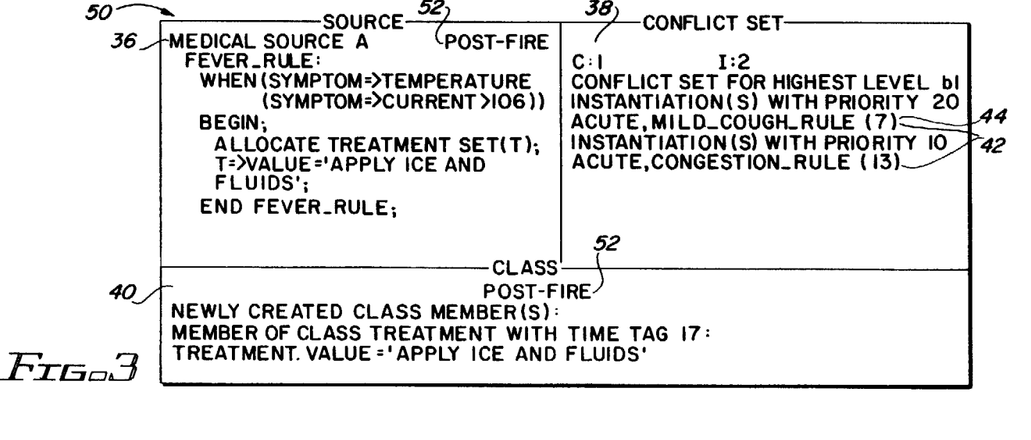
FIG. 3 is a screen image of the postfire display immediately after the issuance of the STEP command for FIG. 2.

An example postfire display is shown in FIG. 3. This example shows the postfire display that occurs immediately after firing the rule instantiation shown in the prefire display in FIG. 2. The postfire display 50 includes the same three separate windows as the prefire display: the source window 36, the conflict set window 38, and the class window 40. Only those aspects of the postfire display 50 which differ from the prefire display 34 described above will be discussed below.

The source code is positioned in the source window 36 to display the text of the rule in the just-fired instantiation. The first line of the source window shows the Postfire indicator 52. Note that after firing the instantiation 44 shown in the prefire display 34 in FIG. 2, the same rule text (e.g. FEVER_RULE) continues to be shown in the source window of the postfire display 50.

The current conflict set is presented in the conflict set window 38. The format of the conflict set is the same as in the prefire display. Note that after firing the instantiation 44 shown in the prefire display 34 in FIG. 2, the "current" conflict set is now different. The postfire display 50 shows the conflict set resulting from the effects of firing the instantiation shown in the prefire display. In the example postfire display 50, the just-fired instantiation "ACUTE, FEVER_RULE (16)" is no longer in the conflict set.

The first line of the class window 40 shows the Postfire indicator 52. The class window shows the data elements (class members) that were modified by the just-fired rule. Also shown are data in the just-fired instantiation that were unchanged by the just-fired rule. FIG. 3 shows that the result of firing the selected instantiation "ACUTE, FEVER_RULE (16)" is that a new data element of the class TREATMENT was created with the VALUE of "Apply ice and fluids".

The data in the postfire display 50 are presented in the same format as in the prefire display. However, they are grouped according to the type of modification. Each group is preceded by a line describing the type of modification made to that group. The groups are sorted so that modified data is listed before unchanged data.

The postfire display 50 allows the user to observe any modifications made to the data after an instantiation 44 is fired, and to determine whether the correct modifications were made to the data. To determine whether the correct modifications were made, the user needs to see the modified data in the context of the text of the rule and the data in the just-fired instantiation. The postfire display presents this information in separate windows 36, 38, 40 on the same display, further simplifying the job of debugging an expert system.

Example of Use of the Debugger

The following illustrates the use of the STEP command in a sample medical treatment production system. The purpose of the system is to prescribe treatments based on the rules in the system and on a set of symptoms (data) input to the system. It is assumed that the symptoms (data) have been already been input to the system, and the user wishes to examine the step-by-step behavior of the system as it decides which treatments to prescribe.

After the debugger is started, the initial (prefire) display 34 is automatically presented as shown in FIG. 2. The conflict set window 38 shows that three instantiations 42 are eligible to be fired based on the rules and data in the system. The next instantiation to be fired 44 is presented as the first instantiation in the conflict set window (ACUTE, FEVER_RULE (16)).

The source window 36 automatically shows the text of the rule in the next instantiation 44 to be fired (FEVER_RULE). The rule may be paraphrased in English as, "IF the patient has a temperature over 105 degrees THEN the treatment should include applying ice and fluids". The class window 40 automatically shows the data element in the next instantiation 44 to be fired. The data element indicates the fact that the patient's temperature is 106 degrees.

The user specifies the STEP command to cause the rule to be fired and the postfire display 50 to be displayed as shown in FIG. 3. The conflict set window 38 shows that now two instantiations 42 are eligible to be fired. The next instantiation to be fired 44 is presented as the first instantiation in the conflict set window (ACUTE, MILD_COUGH_RULE (7)). The source window 36 automatically shows the text of the rule in the just-fired instantiation (FEVER_RULE).

The class window 40 automatically shows the data element newly created by the just-fired instantiation. The data element indicates that the patient's treatment should include the application of ice and fluids. By comparing the action part of the rule to the new data element in the class window, the user can observe that the action part of the rule was carried out properly.

Figure 4:
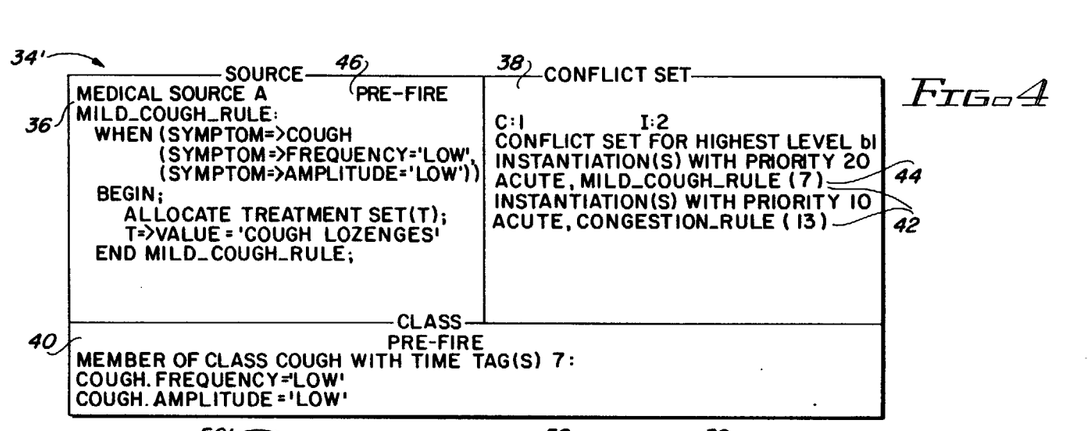
FIG. 4 is a screen image of the prefire display of the medical treatment system of FIG. 2, immediately after the issuance of the STEP command for FIG. 3.

The user then specifies the STEP command again to cause the next prefire display 34' to be presented. This prefire display is illustrated in FIG. 4. The conflict set window 38 continues to show the same conflict set as before. The source window 36 automatically shows the text of the rule in the next instantiation to be fired 44 (MILD_COUGH_RULE). The rule may be paraphrased in English as, "IF the patient has a cough with low frequency and low amplitude THEN the treatment should include cough lozenges". The class window 40 automatically shows the data element in the next instantiation 44 to be fired. The data element indicates the fact that the patient has a low frequency, low amplitude cough.

Figure 5:
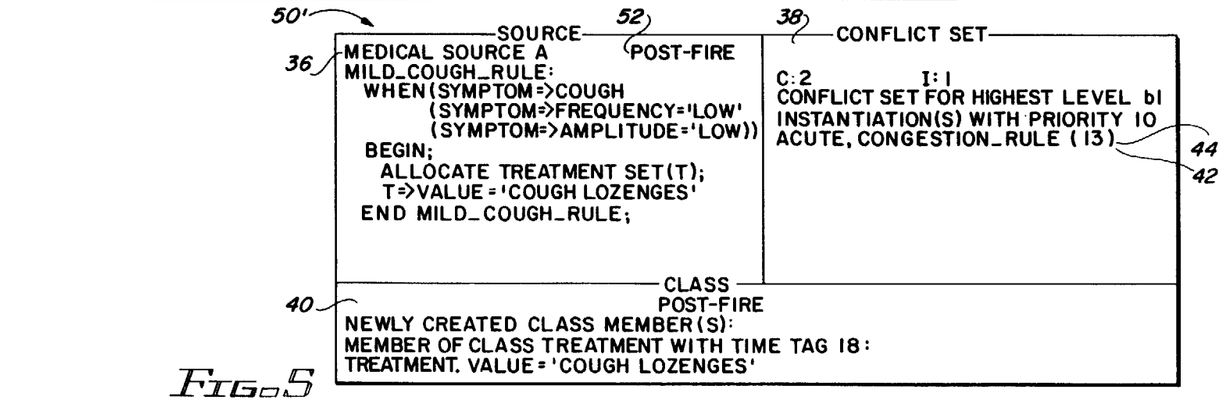
FIG. 5 is a screen image of the postfire display immediately after the issuance of the STEP command for FIG. 4.

The user again specifies the STEP command to cause the rule to be fired and the postfire display 50' to be displayed as shown in FIG. 5. The conflict set window 38 shows that now only one instantiation 42 is eligible to be fired (ACUTE_CONGESTION_RULE (1 3)). The source window 36 automatically shows the text of the rule in the just-fired instantiation (MILD_COUGH_RULE). The class window 40 automatically shows the data element newly created by the just-fired instantiation. The data element indicates that the patient's treatment should include the application of cough lozenges. By comparing the action part of the rule to the new data element in the class window 40, the user can again observe that the action part of the rule was carried out properly.

By continuing to use the STEP command in the manner outlined, the user can observe the step-by-step behavior of the sample medical treatment production (expert) system. By comparing the actual behavior of the system with the intended behavior, the user can find and correct errors in the system, i.e. can debug the system.

The method of debugging described by this invention may be implemented using either overlapped or tiled windows. Windowed displays typically provide functions to reposition and resize windows on the screen with respect to each other. Overlapped windows allow one window to partially or fully overlap another window. This is analogous to having sheets of paper overlapping each other on a messy desk top. Tiled windows do not allow windows to overlap. This is analogous to having sheets of paper neatly arranged on a desk top so the edges of the sheets do not overlap each other. With overlapped windows, the order in which windows are displayed on the screen is important since this determines which window overlaps another. With tiled windows, the order in which windows are displayed is not important since no window overlaps another. The STEP command pseudocode illustrated in Example 1 assumes tiled windows because the windows are always displayed in the same fixed order. It could be easily modified to fit the overlapping method by basing the order of display of windows in any arbitrary order. And, of course, the method of debugging described by this invention could be applied to any forward-chaining production system.

It will be appreciated that, although a specific embodiment of the invention has been described herein for purposes of illustration, various modifications may be made without departing from the spirit and scope of the invention. Accordingly, the scope of protection of this invention is limited only by the following claims.

We claim:

1. In an expert system including storage means for storing data and rules, and execution means for identifying one or more eligible rules (instantiations) based on the data, selecting one of those rules and firing rule to modify the data, the improvement characterized by a debugger comprising:
   (a) means for displaying at least one of the eligible rules;
   (b) means for displaying at least part of the data; and
   (c) means responsive to the user for alternating between at least
      (i) a prefire state before firing of the selected rule, in which at least one of the eligible rules and at least part of the data are automatically displayed, and
      (ii) a postfire state after firing of the selected rule, in which at least one of the newly-identified eligible rules and at least part of the modified data are automatically displayed.

2. The debugger of claim 1, wherein the expert system is a forward-chaining production system.

3. The debugger of claim 1, further including means for displaying the selected rule, and wherein the display during the prefire state further includes the selected rule.

4. The debugger of claim 1, further including means for displaying the selected rule, and wherein the display during the postfire state further includes the selected rule.

5. The debugger of claim 1, wherein the stepping means calls the execution means when stepping from the prefire state to the postfire state.

6. The debugger of claim 1, further including means responsive to the user for executing control program commands while using the debugger.

7. The debugger of claim 6, wherein execution of control program commands while using the debugger causes the debugger to be placed in the prefire state.

8. The debugger of claim 1, further including means responsive to the user for executing other debugging commands while using the debugger.

9. The debugger of claim 8, wherein the execution of other debugger commands while using the debugger leaves the debugger's state unchanged.

10. The debugger of claim 1, wherein the eligible rules, the selected rule, and the data are displayed concurrently in separate windows on a display screen.

11. The debugger of claim 1, wherein the displays of the prefire and postfire displays are alternated on a display screen.

12. A method for an expert system, the system including storage means for storing data and rules, and execution means for identifying one or more eligible rules based on the data, selecting one of these rules, and firing the selected rule to modify the data, the method comprising the steps in order of:
   (a) automatically displaying a prefire display including at least one of the eligible rules, the selected rule, and at least part of the data;

(b) waiting for the occurrence of a preselected event;
(c) calling the execution means to fire the selected rule, identify a new set of eligible rules, and select a rule to be fired;
(d) automatically displaying a postfire display including at least one of the newly eligible rules, the just-fired rule, and at least part of the modified data;
(e) waiting for the occurrence of a second preselected event; and
(f) repeating in order steps (a)–(e).

13. The method of claim 12, wherein the preselected events of steps (b) and (e) comprise the entry of respective commands by the user.

14. The method of claim 13, wherein the commands are the same.

15. The method of claim 12, wherein the step (a) displays the eligible rules, the selected rule, and the data in separate windows.

16. The method of claim 15, wherein the step (a) displays names of all the eligible rules and text of the selected rule.

17. The method of claim 12, wherein the step (d) displays the newly eligible rules, the just-fired rule and the data is separate windows.

18. The method of claim 17, wherein the step (d) displays names of all the newly-eligible rules and text of the just-fired rule.

19. The method of claim 12, wherein the prefire display and the postfire display each comprises a first window for displaying at least part of the eligible rules, a second window for displaying the selected rule and the just-fired rule, respectively, and a third window for displaying at least part of the data.

20. The method of claim 12, wherein the steps (a) and (d) display at least partial text of the selected and just-fired rules, respectively.

21. The method of claim 12, wherein the steps (a) and (d) display the data relating to the selected and just-fired rules, respectively, 22. A debugger for a computer-implemented expert system having storage means for storing data and rules and execution means for identifying a conflict set, selecting a rule instantiation to be fired, and firing the selected rule instantiation to modify the data, the debugger comprising:
(a) means for alternating between at least a prefire state before execution of the selected instantiation, and a postfire state after firing of the instantiation and selection of another instantiation to be fired;
(b) means for automatically displaying at least part of the conflict set, the selected instantiation, and at least part of the data when the debugger is in the prefire state; and
(c) means for automatically displaying the just-fire instantiation and at least part of the modified data when the debugger is in the postfire state.

23. The debugger of claim 22, wherein the expert system is a forward-chaining production system.

24. The debugger of claim 22, wherein the means for stepping comprises a user command implemented on the computer.

25. The debugger of claim 22, wherein both means for displaying comprise a display terminal of the computer.

26. The debugger of claim 22, wherein the means for displaying in the postfire state further displays at least part of a newly identified conflict set.

* * * * *